United States Patent [19]
Giannuzzi

[11] Patent Number: 5,282,708
[45] Date of Patent: * Feb. 1, 1994

[54] SELF-TAPPING SCREW-TYPE MASONRY ANCHOR

[76] Inventor: Louis N. Giannuzzi, 59 Dingletown Rd., Greenwich, Conn. 06830

[ * ] Notice: The portion of the term of this patent subsequent to Feb. 23, 2010 has been disclaimed.

[21] Appl. No.: 14,461

[22] Filed: Feb. 5, 1993

Related U.S. Application Data

[63] Continuation-in-part of Ser. No. 912,478, Jul. 13, 1992, Pat. No. 5,188,496.

[51] Int. Cl.$^5$ .................. F16B 25/00; F16B 39/30
[52] U.S. Cl. .................. 411/386; 411/310; 411/426
[58] Field of Search .................. 411/307-309, 411/386, 387, 411, 422, 424, 426, 418, 310

[56] References Cited

U.S. PATENT DOCUMENTS

| | | | |
|---|---|---|---|
| 3,351,115 | 11/1967 | Boehlow | 411/308 X |
| 3,937,119 | 2/1976 | Ernst | 411/422 |
| 4,439,077 | 3/1984 | Godsted | 411/411 |
| 4,842,467 | 6/1989 | Armstrong | 411/386 |
| 5,044,853 | 9/1991 | Dicke | 411/386 |
| 5,188,496 | 2/1993 | Giannuzzi | 411/386 |

FOREIGN PATENT DOCUMENTS 2815247 10/1979 Fed. Rep. of Germany ...... 411/386

Primary Examiner—Neill R. Wilson
Attorney, Agent, or Firm—Michael Ebert

[57] ABSTRACT

A self-tapping, screw-type masonry anchor which can readily be turned into a hole drilled in a masonry structure to secure an object thereto, the installed anchor being highly resistant to pull-out forces. The anchor, which is fabricated of hard metal, includes a head engageable by a torque-producing tool to rotate the anchor, and a shank extending therefrom provided with a root section surrounded by a helical male cutting thread whose series of convolutions have sharp crests and extend from the leading to the trailing end of the root section. The crests of the male thread diameters are greater than that of the hole and decrease progressively from the leading to the trailing end to create a reverse taper. When the anchor is screwed into the drilled hole to tap its wall, the large diameter crest at the leading end of the male thread cuts an internal female thread in the wall having convolutions of substantially uniform diameter which intermesh with the reverse-taper convolutions of the male thread.

7 Claims, 2 Drawing Sheets

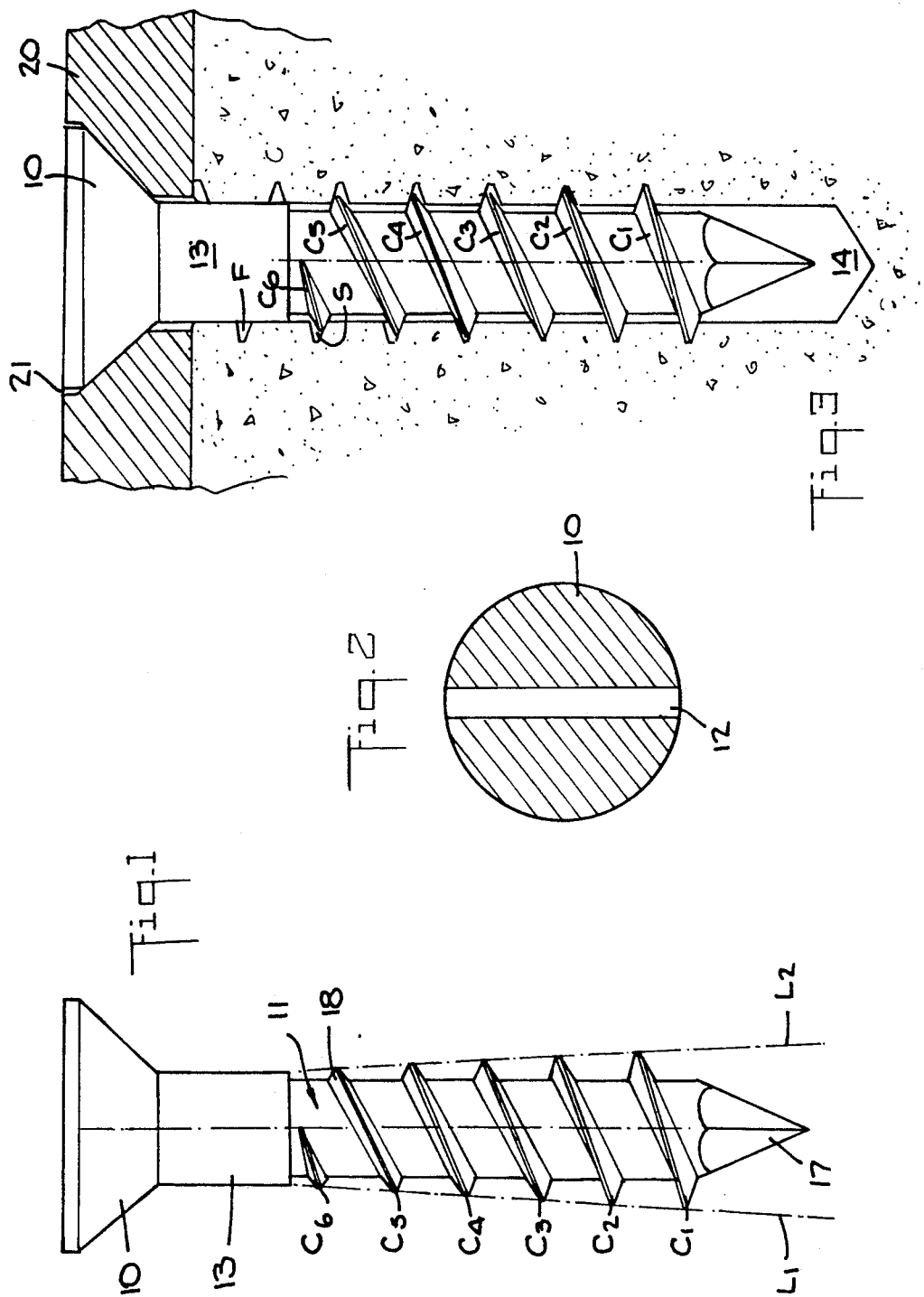

SELF-TAPPING SCREW-TYPE MASONRY ANCHOR

RELATED APPLICATION

This application is a continuation-in-part of my co-pending application Ser. No. 912,478, filed Jul. 13, 1992, entitled "Self-Tapping Screw Type Masonry Anchor," now U.S. Pat. No. 5,188,496 the entire disclosure of which is incorporated herein by reference.

BACKGROUND OF INVENTION

1. Field of Invention:

This invention relates generally to masonry anchors, and more particularly to a self-tapping, screw-type masonry anchor which can readily be turned into a hole bored in a masonry structure to secure a fixture or other object thereto, the installed anchor being highly resistant to forces seeking to pull the anchor out of the hole.

2. Status of Prior Art:

It is frequently necessary to secure fixtures, brackets, channel pieces and other more or less heavy objects to the surface of a masonry structure formed of concrete, brickwork or other masonry material. These objects are fastened to the masonry structure by masonry anchors.

Concrete is made by mixing cement and an aggregate of inert particles of varying size, such as a combination of sand or broken stone screenings with gravel. Compressive strength is generally accepted as the principal index to the structural quality of concrete. Mixtures for concrete masonry structures, such as walls and partitions, ordinarily employ aggregates having a maximum size of one-half inch. Masonry brick is usually formed from clay, shale or pumice hardened by heat. Bricks for this purpose are available in different degrees of harness, depending on the material used in making the brick.

But regardless of the material used in forming a masonry structure, when a hole is drilled therein to receive a metal masonry anchor whose threaded shank taps the wall of the hole, because the material is friable, the tapping action causes the wall to crumble or pulverize.

The patent to Ernst, U.S. Pat. No. 3,937,119, discloses a self-tapping, screw-type metal anchor having a sharp-crested helical male thread surrounding the shank of the anchor, the convolutions of the thread running the length of the shank. This male thread, when the anchor is screwed into a hole drilled in masonry, functions to tape the wall of the hole to create an internal female thread. Since the male thread on the shank mates with the female wall thread, the anchor is then resistant to pull-out forces which seek to back the anchor out of the hole.

Also included in the Ernst anchor is a second thread whose convolutions surround the shank in the successive spaces between the convolutions of the cutting thread. The crests of the second thread have a diameter smaller than that of the cutting thread crests and about equal to the diameter of the masonry hole. This second thread functions as a guide thread to center the anchor in the masonry hole, so that the anchor is not permitted to tilt as it is turned into the hole. By preventing tilting of the anchor in the masonry hole, one enhances its pull-out resistance; for if the anchor were tilted, the crests of the cutting thread would then not be properly embedded in the hole.

In a preferred form of the Ernst masonry anchor, the crests of the cutting thread are not of uniform diameter throughout the length of the shank, but decrease progressively from the trailing end of the shank toward the tip or leading end. According to Ernst, an anchor having a tapered cutting thread can be turned into a masonry hole with a minimal amount of torque by means of a conventional screwdriver.

Another feature of the Ernst masonry anchor resides in a series of notches formed on the crests of the cutting thread along the full length of the shank. These notches, in conjunction with the tapering of the crest diameters of the cutting thread, make it possible to insert the anchor in the masonry hole without unduly disturbing the wall of the hole. Masonry material tends to crumble when worked. But with the gradual chipping carried out by the notches during continued rotation of the anchor, this serves to ensure the firm embedment in the wall of at least the relatively large diameter crests at the trailing end of the cutting thread. According to Ernst, as aggregate particles of the masonry hole wall are gradually removed from the wall by the action of the notches, the material so removed is trapped in the spaces between the convolutions of the cutting thread. The retention of these particles in the spaces enhances the pull-out strength of the anchor.

We have found, however, that an anchor of the Ernest type actually offers low resistance to back out resulting from vibratory and other external forces transmitted to the installed anchor through the masonry structure. These forces may originate from operating machinery mounted on the masonry structure, or heavy moving trucks or other vehicles traveling near the site of the masonry structure. Also, high winds are a factor when the masonry structure is exposed thereto. These forces seek to back the installed anchor out of the masonry hole.

The reason Ernst's masonry anchor, which has a tapered male cutting thread, has poor back-out resistance, is that when turned into a masonry hole to tape the wall of this hole, it then creates on this wall a tapered internal female thread that mates with the tapered male thread. When a male tapered element is fully socketed within a complementary female tapered element, these elements are then contiguous. But if the male element is axially withdrawn even to a slight degree, then the tapered male element is separated from the complementary female element.

An Ernst anchor having a tapered male cutting thread, in its installed state, is intermeshed with the tapered internal female thread in the wall of the masonry hole. If, therefore, the Ernst anchor, which serves to hold an object against the masonry surface, is subjected to vibratory forces of sufficient strength to back the anchor out of the hole even to a slight degree, when this happens the male thread disengages from the female thread. The anchor is then loose and is free to rotate out of the hole, and it ceases, therefore, to hold the object against the masonry.

Another drawback of the Ernst screw-type masonry anchor whose cutting thread has a tapered formation is that it requires a high degree of torque to drive the anchor into the masonry hole. The reason for this is that the diameter of the cutting crests increases progressively from the leading to the trailing end of the shank. Hence, as the anchor is rotated to tap its way into the masonry hole, the wall of the hole is engaged by crests of increasing diameter, this resulting in a progressive rise in drag and greater resistance to rotation.

The high torque required to turn the Ernst masonry anchor into the masonry hole may limit the depth of entry, for a point is reached where even the high torque is insufficient to overcome the resistance to turning, and further advance of the anchor into the hole is arrested. And when the anchor is so arrested, the continued application of a high torque may cause the anchor to fracture or snap in half.

My above-identified copending application discloses a self-tapping, screw-type masonry anchor which, when installed in a hole drilled in a masonry structure to secure an object thereto, is then highly resistant to pull-out forces. This anchor is fabricated of a metal whose harness is such that when it rubs against a masonry surface it is abraded and worn thereby. The anchor includes a head engageable by a torque-producing tool to rotate the anchor, and a shank extending therefrom provided with a root section surrounded by a helical male cutting thread whose series of convolutions extend from the leading to the trailing end of the root section have sharp crests. The crests have diameters greater than that of the hole, the crest diameters decreasing progressively from the leading to the trailing end to create a reverse taper.

When the reverse taper anchor is rotated to cause it to enter the hole and tap its wall, the sharp crest at the leading end of the cutting thread experiences a high degree of wear and blunting, the degree of crest wear diminishing progressively toward the trailing end to effectively erase the taper. Thus, in the installed anchor, the male thread is of substantially uniform diameter and intermeshes with a mating female internal thread in the wall of the hole, this relationship resulting in high resistance to loosening of the anchor.

The effectiveness of a reverse-taper anchor of the type disclosed in my copending application depends on the nature of the masonry in which the anchor is installed. Its nature must be such in relationship to the hardness of the anchor metal as to wear down and blunt the sharp crests of the reverse-taper male thread, so that when the anchor is installed, the taper is then erased. However, in some cases, the abrasive nature of the concrete, or whatever other form of masonry is involved, may be such as to give rise to little wear or to produce excessive wear of the crests. Hence, while in most masonry installations the wearable reverse-taper anchor is highly effective; in some cases, it is less so.

Of prior art background interest are the following references: The U.S. Pat. Nos. 3,351,115 (Boehlow); 4,842,467 (Armstrong); 4,439,077 (Godstead); 5,044,853 (Dicke) and German patent 2,815,247 to Fischer (1979).

SUMMARY OF INVENTION

In view of the foregoing, the main object of this invention is to provide a self-tapping screw anchor which can readily be turned into a hole drilled in a masonry structure to secure an object thereto, the installed anchor being highly resistant to pull-out forces.

More particularly, an object of this invention is to provide an anchor of the above type whose shank, which is of hard metal, has a male cutting thread in a reverse taper formation so that it is the thread crests of relatively large diameter at the leading end of the thread that function to tap an internal female thread in the wall of the drilled hole.

A significant feature of a screw-type anchor in accordance with the invention having a reverse taper male thread is that when this anchor is turned into a masonry hole, it creates in the wall of this hole an internal female thread of substantially uniform diameter, the intermeshing male and female threads rendering the anchor highly resistant to loosening. Because of this relationship, the clearances between the intermeshing convolutions of the male and female threads become progressively greater as one goes from the large diameter crest at the leading end of the male thread to the smaller diameter crest at the trailing end. These successively greater clearances serve to accommodate the particles excised from the masonry by the anchor as it taps its way into the masonry hole.

Briefly stated, these objects are attained in a self-tapping, screw-type masonry anchor which can readily be turned into a hole drilled in a masonry structure to secure an object thereto, the installed anchor being highly resistant to pull-out forces. The anchor, which is fabricated of hard metal, includes a head engageable by a torque-producing tool to rotate the anchor, and a shank extending therefrom provided with a root section surrounded by a helical male cutting thread whose series of convolutions have sharp crests and extend from the leading to the trailing end of the root section. The crests of the male thread diameters are greater than that of the hole and decrease progressively from the leading to the trailing end to create a reverse taper. When the anchor is screwed into the drilled hole to tap its wall, the large diameter crest at the leading end of the male thread cuts an internal female thread in the wall having convolutions of substantially uniform diameter which intermesh with the reverse-taper convolutions of the male thread.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is an elevational view of one embodiment of self-tapping, screw-type anchor according to the invention in the form it takes before being installed in a masonry hole;

FIG. 2 is a top view of the anchor;

FIG. 3 shows the form the masonry anchor takes after it has been installed in the masonry hole to secure an object thereto;

DESCRIPTION OF INVENTION

Figure 5:
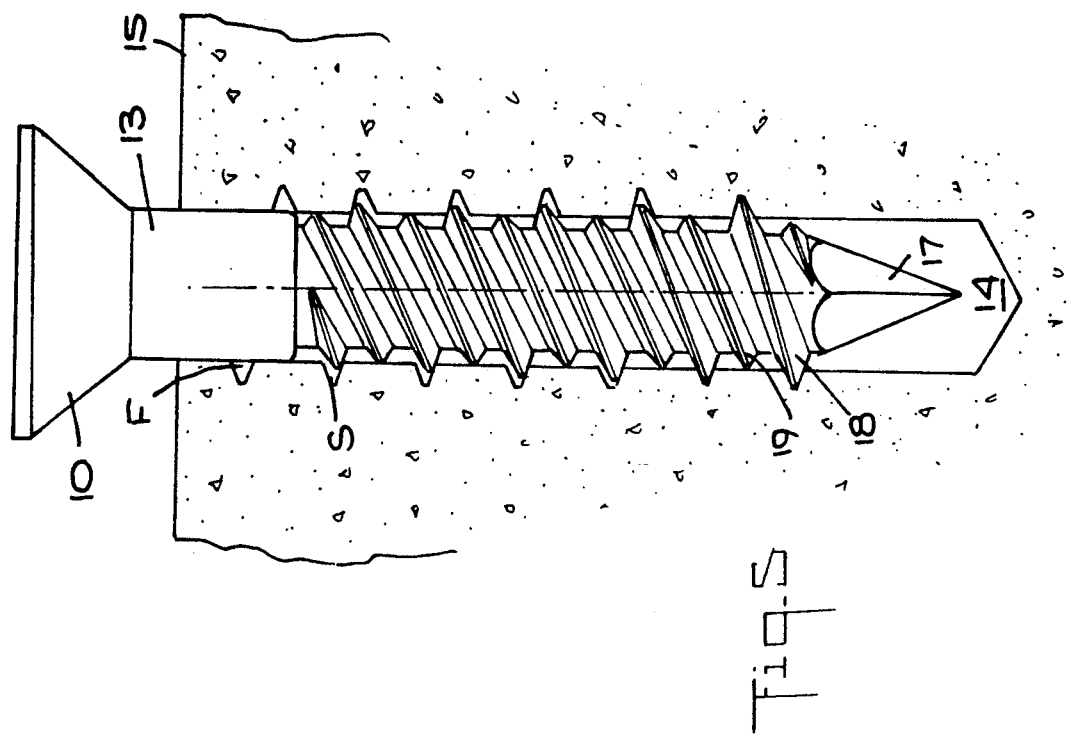
FIG. 5 shows this anchor installed in a masonry hole.

First Embodiment:

Referring now to FIGS. 1 and 2, there is shown a self-tapping, screw-type masonry anchor in accordance with the invention in the form it takes before it is installed. FIG. 3 illustrates the anchor after it is installed in a masonry hole.

The anchor includes an enlarged head 10 having a frusto-conical shape from which extends a shank, generally designated by reference numeral 11. Head 10 has a diametrical slot 12 cut into its top adapted to receive the blade of a screwdriver or other torque-producing tool. The head, however, may take other forms appropriate to the type of tool being used to turn the anchor into the masonry hole.

Shank 11 has a short, unthreaded cylindrical upper section 13 which is integral with head 10 and has a diameter slightly smaller than the diameter of a hole 14 bored into a concrete or other masonry structure 15, as shown in FIG. 3, to receive the anchor.

The remainder of the shank is constituted by a cylindrical root section 16 whose diameter is slightly reduced with respect to upper section 13, and terminates at its leading end in a faceted, pointed tip 17 which acts to guide the leading end of the shank into the hole. In practice, the tip may be blunt or take other forms.

Surrounding root section 16 and running its full length is a helical male cutting thread 18 having a series of convolutions $C_1$ to $C_6$ provided with sharp crests. The crest diameter of these convolutions is greatest at the leading end of the root section and decreases progressively so that it is smallest at the trailing end. However, the crest diameter of convolution $C_6$, which is the smallest in the series, is greater than the diameter of hole 14.

As a result of the progressively smaller diameters of the cutting crests of convolutions $C_1$ to $C_6$, the male cutting thread 18 has a reverse taper formation. This is represented by the outwardly inclined lines $L_1$ and $L_2$ which are tangential to these crests.

The term reverse taper is used to distinguish this taper from that of a conventional screw in which the diameter of the thread is smallest at the tip end of the screw and greatest at the head end. And it also serves to distinguish the anchor taper from the taper of the cutting thread in the Ernst masonry anchor in which the crest diameter is smallest at the leading end and greatest at the trailing end.

Alternatively, head 10 may be in the form shown in the Ernst patent, and the short, non-threaded upper section 13 of the shank omitted, so that the male cutting thread surrounds the shank along its full length, except for the tip.

The anchor is fabricated of a metal such as steel or a ferrous alloy which is resistant to corrosion and is inherently hard or rendered hard. Hence, when the anchor acts to tap a hole drilled in masonry to create an internal female thread therein, the masonry, regardless of its nature and its abrasive characteristics, will not to a significant degree wear down the sharp crests on the male thread surrounding the shank of the anchor.

The term hardness as applied to metals has been variously defined as resistance to local penetration, to scratching, to machining, to wear or abrasion, and to yielding. In the context of the present invention, the hardness of the anchor metal imparts thereto a high resistance to wear and abrasion. As is well known, a metal may be rendered hard by heat treatment, cold working or other forms of metal processing.

As shown in FIG. 3, when the anchor is used to secure a plate 20 against the surface of masonry structure 15, the shank of the anchor passes through a countersunk mounting hole 21 in the plate, and head 10 of the anchor is nested therein to hold the plate against the wall. It is essential that the installed anchor not be subject to loosening by vibratory forces.

In installing the anchor, it is rotated by a tool to turn into a masonry hole 14 and in doing so tap the wall of this hole. The sharp crest of the leading convolution $C_1$, which has the largest diameter of the series, has the longest way to go, for it must travel almost the full depth of the hole. In doing so, crest $C_1$ taps an internal female thread F in the wall of hole 14, the female thread having a uniform diameter determined by the large diameter of crest $C_1$. Since the remaining crests $C_2$ to $C_6$ are of progressively smaller diameter, and they successively enter the convolutions of uniform diameter of the internal female thread, crests $C_2$ to $C_6$ do not cut into the wall of the masonry hole, for the wall has already been cut by crest $C_1$ to define the convolutions of the female thread.

It therefore takes a reduced torque to turn the reverse-taper anchor into the masonry hole, for crests $C_2$ to $C_6$ of progressively diminishing diameter are not resisted by the masonry and simply enter the convolutions already created by cutting crest $C_1$ of largest diameter. Because of this, the level of torque required to rotate the anchor is reduced and it becomes less difficult to turn the anchor fully into the hole. Hence, the danger that the anchor will snap in the course of being installed is minimized.

In contradistinction, in the tapered anchor disclosed in the above-identified Ernst patent, the leading cutting crest which is of small diameter cuts relatively shallow convolutions in the hole of the masonry wall, and the succeeding crests of progressively greater diameter, each cut the hole wall to further deepen these convolutions. Consequently, the succeeding crests impose an increased degree of drag and resist rotation of the anchor.

Because the convolutions defining the internal female thread F are of uniform diameter, whereas crests $C_1$ to $C_6$ of the male thread socketed in the convolutions of the female thread are of progressively smaller diameter, the resultant intermeshing relationship is highly resistant to pull-out forces transmitted by the masonry arising from external vibrations or other sources. An axial pull-out force will not effect disengagement of the reverse-tapered male thread from the female thread of uniform diameter, as in the case of correspondingly tapered male and female threads.

Since the convolutions which define the internal female thread F in the wall of the hole all have a common diameter determined by the diameter of the largest crest $C_1$ of the male thread on the anchor, there is virtually no clearance in the lowermost convolution in which crest $C_1$ is nested. But in the succeeding convolutions in which crests $C_2$ to $C_6$ are nested, since these crests are of progressively smaller diameter, this creates a clearance S, the size of which depends on the difference between the diameter of the female convolution and that of the male convolution nested therein. These clearances reduce the contact force between the concrete or whatever other form of masonry is involved and the crests of the male thread. The clearances also provide spaces to receive and accommodate the chips and particles excised from the concrete in the tapping process.

In concrete or other forms of masonry in which the anchor is installed, if the concrete is extremely hard, it may act to somewhat wear the reverse-taper male thread of the hardened metal anchor in accordance with the invention, but without altering its essential features. If, for example, the leading cutting crest $C_1$ in the male thread, as it cuts its way into the masonry hole, is subjected to wear, as a consequence of which its diameter is slightly reduced, then the second crest $C_2$ of slightly smaller diameter than the diameter of crest $C_1$, in its unworn state, will now contribute to the cutting action in tapping a female thread. But the reverse taper of the male thread will be substantially retained.

Figure 4:
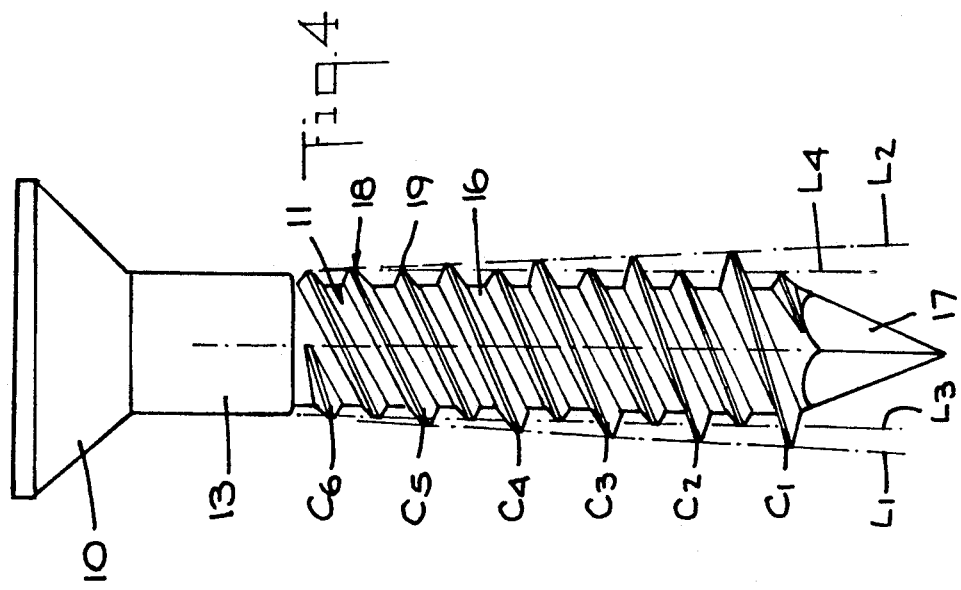
FIG. 4 is an elevational view of a second embodiment of an anchor in accordance with the invention.

Second Embodiment:

The self-tapping screw anchor shown in FIGS. 4 and 5 is the same as that shown in FIGS. 1 to 3 and is made of a similar hardened metal, except that in addition to a male cutting thread 18 formed by crests $C_1$ to $C_6$ in a reverse-taper formation, also provided is a helical guide thread 19 whose series of convolutions $G_1$ to $G_6$ lie in the successive spaces between convolutions $C_1$ to $C_6$ of cutting thread 18.

Guide convolutions $G_1$ to $G_6$ are of uniform diameter along the length of root section 16, this diameter matching the diameter of upper section 13 of the shank. The low guide thread 19 acts to center the anchor as it enters the masonry hole to prevent it from tilting, in which event the high cutting thread 18 would not properly tap the hole. The uniform diameter of the guide thread is made evidence by parallel dashed lines $L_3$ and $L_4$ tangential to the crests of guide convolutions $G_1$ to $G_6$.

In practice, the male thread may be notched in the manner disclosed in my copending application.

While there have been shown and described preferred embodiments of an improved, self-tapping, screw-type masonry anchor in accordance with the invention, it will be appreciated that many changes and modifications may be made therein without, however, departing from the essential spirit thereof.

I claim:

1. A self-tapping, screw-type anchor insertable in a hole having a predetermined diameter bored in a structure formed of friable material to secure an object thereto, said anchor being fabricated of a substance whose hardness is such that when it taps the wall of this hole, it is not significantly abraded and worn thereby, said anchor comprising:
   (a) an enlarged head engageable by a torque-producing tool to rotate the anchor; and
   (b) a shank integral with the head and extending therefrom, said shank including a root section having a leading end and a trailing end, and a helical cutting thread surrounding the root section formed by a series of convolutions having sharp crests running from the leading to the trailing end, said crests having diameters greater than that of the hole and decreasing progressively from the leading to the trailing end to create a reverse taper male thread, whereby when the tool acts to rotate the anchor to cause the male thread to tap its way into the wall of the hole, then formed on the wall of the hole is an internal female thread in whose convolutions are nested the convolutions of the male thread.

2. An anchor as set forth in claim 1, in which the anchor is made of hardened steel, and the structure is a masonry structure.

3. An anchor as set forth in claim 1, in which said shank includes a non-threaded cylindrical upper section interposed between the root section and the head.

4. An anchor as set forth in claim 1, wherein the leading end of the root section terminates in a tip.

5. An anchor as set forth in claim 1, wherein said head has a frusto-conical shape and a slot in its top to receive the blade of a screwdriver.

6. An anchor as set forth in claim 1, further including a guide thread surrounding the root section having a series of convolutions of uniform diameter lying in the successive spaces between the convolutions of the male thread, the diameter of said guide thread convolutions being smaller than the diameter of the hole.

7. An anchor as set forth in claim 1, in which the structure is formed of concrete and said object is provided with a mounting hole to pass the shank of the anchor and to retain the head thereof.

* * * * *